Nov. 22, 1955     E. E. PRATHER     2,724,451

DOOR AND VEHICLE SPEED CONTROLLED BRAKE OPERATING MECHANISM

Filed July 26, 1951

INVENTOR.
EDWIN E. PRATHER
BY
H. O. Clayton
ATTORNEY

United States Patent Office 2,724,451
Patented Nov. 22, 1955

2,724,451
DOOR AND VEHICLE SPEED CONTROLLED BRAKE OPERATING MECHANISM

Edwin E. Prather, South Bend, Ind., assignor to Bendix Aviation Corporation, South Bend, Ind., a corporation of Delaware Application July 26, 1951, Serial No. 238,682

3 Claims. (Cl. 180—82.1)

This invention relates in general to brake mechanism for automotive vehicles and more particularly to power means for controlling the operation of the wheel brakes of the vehicle.

In a certain automotive and power brake mechanism of the day there has been included control means for effecting an application of the rear brakes when a door of the vehicle is opened. However, this mechanism often results in an excessive and ill timed operation of the brakes, accordingly it is an object of my invention to provide a simple and effective power mechanism for operating the brakes, preferably the front brakes of the heavier type of automotive vehicles such as a passenger carrying bus; and it is the principal object of my invention to provide such a brake mechanism wherein the aforementioned brakes are automatically applied by power means when the door of the vehicle is opened and when the vehicle has been decelerated to a relatively low speed in the process of bringing the vehicle to a stop. In other words with the mechanism of my invention certain brakes of an automotive vehicle are applied during the operation of bringing the vehicle to a stop and preferably just prior to the complete stopping of the vehicle.

It is a further object of my invention to provide electrical means for controlling the operation of a power brake mechanism of an automotive vehicle, said means being certain of operation and adjustable as to the timing of its operation.

The above and other objects and features of the invention will appear more fully hereinafter from a consideration of the following description taken in connection with the accompanying drawings where one embodimnt of the invention is illustrated by way of example.

Figure 1:
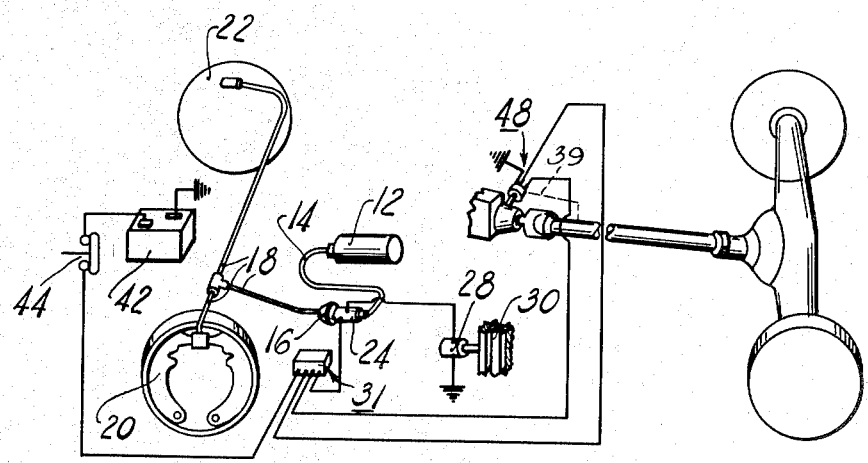
Figure 2:
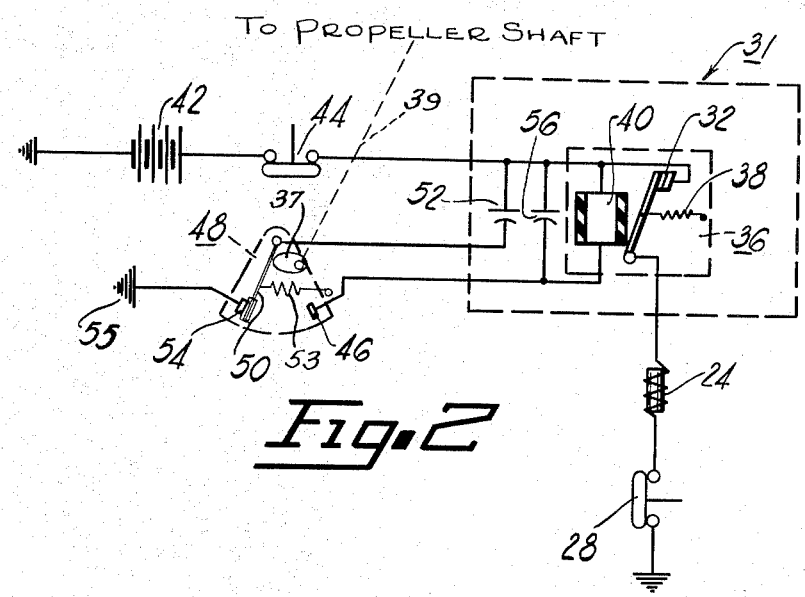

Figure 1 is a diagrammatic view disclosing one embodiment of the brake mechanism of my invention; and Figure 2 discloses the electrical hookup of the mechanism of Figure 1.

There is disclosed in Figures 1 and 2 a preferred embodiment of my invention wherein my brake operating mechanism is employed to control a portion of a well known type of brake mechanism of an automotive vehicle.

This brake mechanism preferably includes a compressed air storage tank 12. The compressed air from the tank is led by a conduit 14, to a solenoid operated valve 16 which, when opened interconnects the conduit 14 with conduits 18; and the latter serve to lead the compressed air to the front brakes 20 and 22 of the vehicle. Both the front and rear brakes of the vehicle may be operated by any of the well known air brake mechanisms; however, for simplicity this mechanism is not disclosed herein.

The principal feature of my invention relates to the door and governor controlled electrical mechanism for controlling the operation of a solenoid 24 which operates the valve 16. In brief this electrical mechanism includes, preferably in series, a grounded door operated breaker switch 28 which is closed when a door 30 of the vehicle is opened, an electric governor 31 described hereinafter, and a grounded battery 42 or other sources of electricity; and this electric circuit may also include, if desired, the ignition switch 44 of the vehicle. Obviously the aforementioned circuit may be wired so that the same is closed, to energize the solenoid 24, when any one of the doors of the vehicle is opened.

In certain automotive vehicles of the day the solenoid 24 is controlled by a door operated switch which is closed, to effect an application of the air brakes or other power operated brakes, whenever the door is opened; however, this mechanism is undesirable inasmuch as the brakes may be applied regardless of vehicle speed. Accordingly it is the object of my invention to provide a control wherein the brakes, preferably the two front brakes of the vehicle, are applied when a door of the vehicle is opened provided the vehicle speed has been lowered to a certain factor.

Describing now the electric governor control means of Figures 1 and 2 there is provided a normally closed switch 32 of a relay 36; and this switch is preferably biased to its closed position by a spring 38. The coil 40 of the relay is electrically connected in series with the grounded battery 42, the ignition switch 44 of the vehicle, and an insulated contact 46 of a single pole double throw vehicle speed responsive switch 48 no claim to which is made. The common arm 50 of the switch 48, shown in its neutral position in Figure 2, is electrically connected in series with a condensor 52 of relatively low capacity, say 500 mfd., the ignition switch 44 and the battery 42; and an insulated contact 54 of the switch 48 is grounded at 55. The normally closed relay switch 32 is electrically connected in series with the valve operating solenoid 24, the grounded door operated breaker switch 28 which is closed when the door 30 is opened, the ignition switch 44, and the grounded battery 42.

One of the principal features of my invention consists of a condensor 56 of relatively high capacity, say 1500 mfd., said condensor being electrically connected in parallel with the relay coil 40. The relay 36 and condensors 52 and 56 may be housed within one container referred to heretofore as the electric governor 31.

Describing now in brief the operation of the embodiment of my invention disclosed in Figures 1 and 2, the mechanism is preferably so adjusted that the brake mechanism is brought into play just before the car is stopped provided, of course, the door 30 is opened. Explaining this operation it is to be remembered that the relay switch 32 is held open by an operation of the relay coil 40 said coil being energized by virtue of the discharging operation of the condensors 52 and 56 particularly the latter; and as set forth below it is to be noted that condensor 56 is charged, to maintain its voltage, by the operation of the condensor 52.

When the vehicle is placed in motion the breaker switch 48 immediately operates, by the movement of the contact 50 into contact with the fixed contact 54, to charge the condensor 52, following which there results, with a movement of the contact 50 into contact with the contact 46, a charging of the condensor 56 to effect an energization of the coil 40. The condensor 56 reaches its full charge when the speed of the vehicle is increased to a certain factor, say five miles per hour. Thereafter condensor 56 operates to maintain the energization of the coil 40; accordingly, the switch 32 is opened thereby rendering the brake control mechanism inoperative; however, when the speed of the car is reduced sufficiently to make the rate of discharge of the condensor 56 exceed the rate of charge thereof then there comes a time, preferably a very short time before the car comes to a stop, when the condensor 56 is discharged sufficiently to reduce the voltage across the relay coil 40 below its drop out value. The switch 32 is then automatically closed by the operation of the spring 38 thereby making possible an operation of the brake control mechanism; and the latter operation is automatically effected when the door 30 is opened to close the switch 28. The relay coil 40 and condensor 56 are preferably wired in parallel in order to hold the relay energized during the half cycle of the breaker switch 48 in which the common arm 50 of the switch is in contact with the grounded side. In other words the common arm of the breaker switch shuttles electrical energy from the battery to the relay, the condensor 56 serving to hold the relay energized while making the exchange. The condensor 56 is used to store the excess energy over that required by the relay coil.

Stressing one of the features of my invention it is to be noted that the construction of the mechanism of my invention, including the construction and arrangement of the condensor 52 and switch 48 of the mechanism, is such that the charging of the condensor 56 is stopped when the vehicle is brought to a stop; for when the vehicle is brought to a stop the switch arm 50 is brought into contact with and remains in contact with either the contact 46 or the contact 54 thereby effecting an operation of the relay to close the switch 32. In other words the mechanism is constructed to insure an operation of the condensor 56 for the purpose intended. On this point it is to be noted that should the switch arm 50 be in contact with the fixed contact 54 when the vehicle is brought to a stop the result will merely be a charging of the condensor 52 to its capacity.

There is thus provided a simple, compact, and efficient control means for controlling the operation of a vehicle brake mechanism. The condensor 56 provides a source of electricity or rather means for storing electrical power utilized to operate the brake control mechanism; and the condensor 52, by its operation of charging the condensor 56, insures an operation of the latter by maintaining a voltage across the relay coil above its drop out value. The operation of the condensor 52 may be likened unto the operation of a pump and the operation of the condensor 56 may be likened unto the operation of a storage tank in the operation of the mechanism of my invention. Described in other words the switch operating power means of my invention includes a motor such as the coil that is electric motor 40 of the relay 36, means for energizing the motor including a source of power such as the condensors 52 and 56, means for controlling the source of power such as the intermittently operated vehicle speed responsive breaker switch 48, and means, such as the condensor 56, controlled by the breaker switch and operable to store energy said energy storing means being activated by the condensor 52 and operable as the principal means for energizing the motor; and the switch operating power means of my invention also includes an intermittently operable source of power, that is the battery 42, for energizing the condensor 52.

The time of operation of the brake control mechanism with respect to the movement of the vehicle, that is the determination of whether or not the brake control mechanism comes into play before or after the car comes to a stop and when this operation is effected, may be controlled by a determination of any one or a plurality of many factors including the capacity of the condensors, the air gap of the relay 36, the resistance of the relay coil 40, the strength of the spring 38 and the speed of operation of the vehicle speed responsive breaker switch 48. The operating means for the switch 48 may include a cam 37, Figure 2, for actuating the movable contact 50 of said switch; and this cam 37 is actuated by a drive shaft 39 operably connected to the propeller shaft of the vehicle. As is made clear by an inspection of Figure 2, the cam 37 moves the contact 50 into contact with the contact 54 against the tension of a spring 53; and continued rotation of the cam 37 results in a contraction of the spring 53 to move the contact 50 into contact with the contact 46.

With the mechanism of my invention the front brakes of the vehicle are automatically applied to bring the vehicle to a stop and then hold the same at rest, when a door is opened and the speed of the vehicle has been lowered to a certain factor, say four M. P. H.; and it is obvious that such a mechanism provides a safety feature inuring to the benefit of the passengers of the vehicle. With such a mechanism the driver of a bus may not pull away from a stop until he has closed the door.

I claim:

1. Power brake mechanism for controlling certain brakes of an automotive vehicle, said mechanism including a control valve, and means for operating the valve to cut the brake mechanism into operation when and only when a door of the vehicle is opened and the vehicle is either at a standstill or is traveling at or below a relatively low speed, said means including a switch actuated by the door of the vehicle, a source of electricity, a solenoid for operating the valve, a relay including a switch and a coil, means for operating said relay switch for closing the same when the vehicle is at a standstill or is traveling at or below a relatively low speed, said means including a condensor for storing electricity, electrical means interconnecting the condensor and coil, and means, including a speed responsive switch mechanism and a condensor, the latter, by virtue of a part of the speed responsive switch mechanism, being electrically connected in parallel with the aforementioned condensor and coil; and means for electrically interconnecting in series the door operated switch, the solenoid, the relay switch, and the source of electricity.

2. The combination, with the brake system of an automotive vehicle including brake operating means and a door of said vehicle, of means for controlling said brake system so as to effect an application of the brakes of the system when and only when the door is opened and all other controls of the control means are operative, said control means including a switch operated by said door, electrical means for, in part, controlling the brake operating means, a relay comprising a coil and a switch, electrical means for interconnecting, in series, the door operated switch, the electrical means and the relay switch, and means for controlling the flow of electricity into said coil including means for storing electricity, electrical means interconnecting the coil and electrical storage means, together with means, including a condensor, for controlling the flow of electricity into and from the storage means and coil and thereby control the time of operation of the switch.

3. The combination, with the brake system of an automotive vehicle including brake operating means and a door of said vehicle, of means for controlling said brake system so as to effect an application of the brakes of the system when and only when the door is opened and all other controls of the control means are operative, said control means including a switch operated by said door, electrical means for, in part, controlling the brake operating means, a relay comprising a coil and a switch, electrical means for interconnecting, in series, the door operated switch, the electrical means, and the relay switch, and means for controlling the flow of electricity into said coil including a condensor serving as an electrical storage means, electrical means interconnecting the coil and condensor, together with means, including a second condensor and a vehicle speed responsive switch mechanism electrically connected therewith, for controlling the flow of electricity into the first mentioned condensor and coil and thereby control the time of operation of the relay switch.

References Cited in the file of this patent

UNITED STATES PATENTS

| 1,182,546 | Fischer et al. | May 9, 1916 |
| 2,056,750 | Vincent | Oct. 6, 1936 |
| 2,217,785 | Betz | Oct. 15, 1940 |
| 2,425,767 | Vang | Aug. 19, 1947 |

FOREIGN PATENTS

| 110,173 | Australia | Apr. 4, 1940 |